United States Patent [19]

Stillwell et al.

[11] Patent Number: 5,056,847
[45] Date of Patent: Oct. 15, 1991

[54] VEHICLE DOOR OPERATING MECHANISM

[75] Inventors: Richard L. Stillwell, Wyoming; Christopher G. Bohn, Kentwood; Daniel W. Boerman, Jenison, all of Mich.

[73] Assignee: Automatic Truck Door, Inc., Grandville, Mich.

[21] Appl. No.: 435,269

[22] Filed: Nov. 13, 1989

[51] Int. Cl.5 ............................................. B62D 25/00
[52] U.S. Cl. ...................................... 296/50; 160/188
[58] Field of Search ................... 296/50, 51; 160/188, 160/189; 49/199

[56] References Cited

U.S. PATENT DOCUMENTS

| | | | |
|---|---|---|---|
| 2,335,336 | 11/1943 | Zoller | 268/59 |
| 2,589,479 | 3/1952 | Curtis | 268/59 |
| 2,634,124 | 4/1953 | Davis | 268/42 |
| 2,687,298 | 8/1954 | Maple | 268/74 |
| 2,789,636 | 4/1957 | Lawick | 160/188 |
| 3,104,910 | 9/1963 | Kappen | 296/51 |
| 3,240,484 | 3/1966 | Klamp | 268/59 |
| 3,695,332 | 10/1972 | Bahnsen | 160/188 |
| 3,934,635 | 1/1976 | Kin | 160/189 |
| 3,955,661 | 5/1976 | Popper et al. | 160/188 |
| 4,611,430 | 9/1986 | Altrogge | 49/199 |
| 4,860,813 | 8/1989 | Ballyns et al. | 296/50 |

Primary Examiner—Robert R. Song
Attorney, Agent, or Firm—Price, Heneveld, Cooper, DeWitt & Litton

[57] ABSTRACT

A vehicle door operating mechanism provides automatic opening and closing of a delivery truck door from within or without the vehicle. A low profile side mounted electric motor operates a closed loop drive means with limit switches assuring proper operation. The motor and drive means cooperate directly with the existing tracking.

31 Claims, 3 Drawing Sheets

VEHICLE DOOR OPERATING MECHANISM

FIELD OF THE INVENTION

This invention relates to a motorized door opening assembly for overhead vehicle doors and, more particularly, to a side mounted door opening assembly for the overhead doors of trucks.

BACKGROUND OF THE INVENTION

Many trucks utilize overhead doors to close their rear vertical openings. For a deliveryman using a van equipped with an overhead door to make a delivery, he exits the cab, walks to the back of the truck, unlocks the latch, and rolls the overhead door into its open position. Sometimes he has to push it up from the ground level, othertimes if he's on a loading dock he can climb up to truck bed level, bend down and pull it up. During the course of a day, the deliveryman must perform this routine task countless times. As is common with many routine tasks, the manual operation of the overhead doors to trucks can benefit greatly by automation.

Automation of the operation of the overhead door would allow a deliveryman to initiate the opening of the door from the cab of the truck so that by the time he walks to the back of the truck the door is already on its way to being completely open. Automation also could ensure that when the door is closed it is automatically locked, avoiding a common error of neglecting to secure a latch. In addition, automation could increase both the security and the safety of operation of the door. Without activation, the door will remain in an open, closed, or semi-open position. Injuries from accidental openings or closing can be prevented by sensitizing the door so that any interference with the movement of the door will cause immediate stoppage. With automation, the operation of the door is much more controllable and greatly increases creature comfort vis a vis inclement weather and reduces back stress and injury.

The present invention serves to automate the operation of the overhead doors on trucks making it possible to reap the above enumerated advantages as well as others which would be obvious to those familiar with the operation of truck overhead doors.

SUMMARY OF THE INVENTION

The present invention relates to a power driven door operating mechanism for an enclosed vehicular load storing container. The container typically has a floor, ceiling, opposed sides, end and an open rear which can be selectively closed by the door. The door is typically comprised of multiple panels hinged together and moveable in opposed tracks. The tracks have a vertical section extending from the floor to the ceiling along each side of the opening, a horizontal section extending along the upper edge of the sides of the container from the open end toward the front end, and a curved section interconnecting the vertical and horizontal sections. This interconnection of the track sections allows the door to be moved from a vertical position where the opening in the container is fully closed to a fully horizontal position immediately beneath the ceiling of the container so as to fully open the rear end.

The power driven door operating mechanism of the preferred embodiment includes a low profile compact reversible electric motor mounted vertically inboard along one of the sides of the container. The motor in a preferred embodiment has an upwardly extending vertical drive shaft and a horizontal drive sprocket fixed to the upper end of the drive shaft. A unique mounting bracket attached to the motor permits removable attachment of the motor and bracket to one of the horizontal track sections forward of the front edge of the door when in the fully open position. Thus, one advantage of the invention is to utilize an existing door track as both the drive track and mounting track.

A pulley is mounted horizontally in the same plane as the sprocket and is mounted at the upper end corner of the container above the curved track section attached to the horizontal track section. A drive means is secured around the sprocket and the pulley to form an endless loop. The drive means may move in a clockwise or counterclockwise direction depending on the directional movement of the motor drive sprocket.

The upper corner of the door and the drive means are connected by a pivotally attached linking means. Movement of the drive means in one direction raises the door selectively between a fully closed position to a fully open position and movement of the drive means in the opposite direction moves the door from a fully raised open position to a fully closed position.

A control means selectively activates the motor to raise and lower the door to the fully opened or closed positions, or intermediate positions.

The invention has numerous advantages over prior vehicular door opening devices. The assembly may be easily fitted to new or existing containers because it is small, compact, and can be located on the side of the container, out of the way of the cargo to be carried in the container. A separate drive track is not required nor is a separate motor mounting attachment required. The assembly effectively allows the rapid operation of the door from the immediate vicinity of the door or from a remote position to facilitate the most efficient and safe delivery of packages. Moreover, the assembly provides for the automatic locking of the door when it is in the closed position and a deactivating switch in the truck cab can effectively discourage or prevent tampering and pilferage. An external lock on the outside of the vehicle or a remote transmitter can also be utilized.

Injuries from accidental openings or closings may be prevented by sensitizing the operating circuits so that any interference with the movement of the door will cause immediate stoppage of the door. An optional advantage is the elimination of the need for an infloor latch mechanisms albeit some form of mechanical backup locking mechanism may be desired. Finally, the ease of operation over the course of time saves or facilitates the prevention of back injuries or other injuries and reduces absenteeism.

These and other objects, advantages, purposes and features of the invention will become more apparent from the study of the following description taken in conjunction with the drawings.

DETAILED DESCRIPTION OF THE PREFERRED EMBODIMENT

Figure 1:
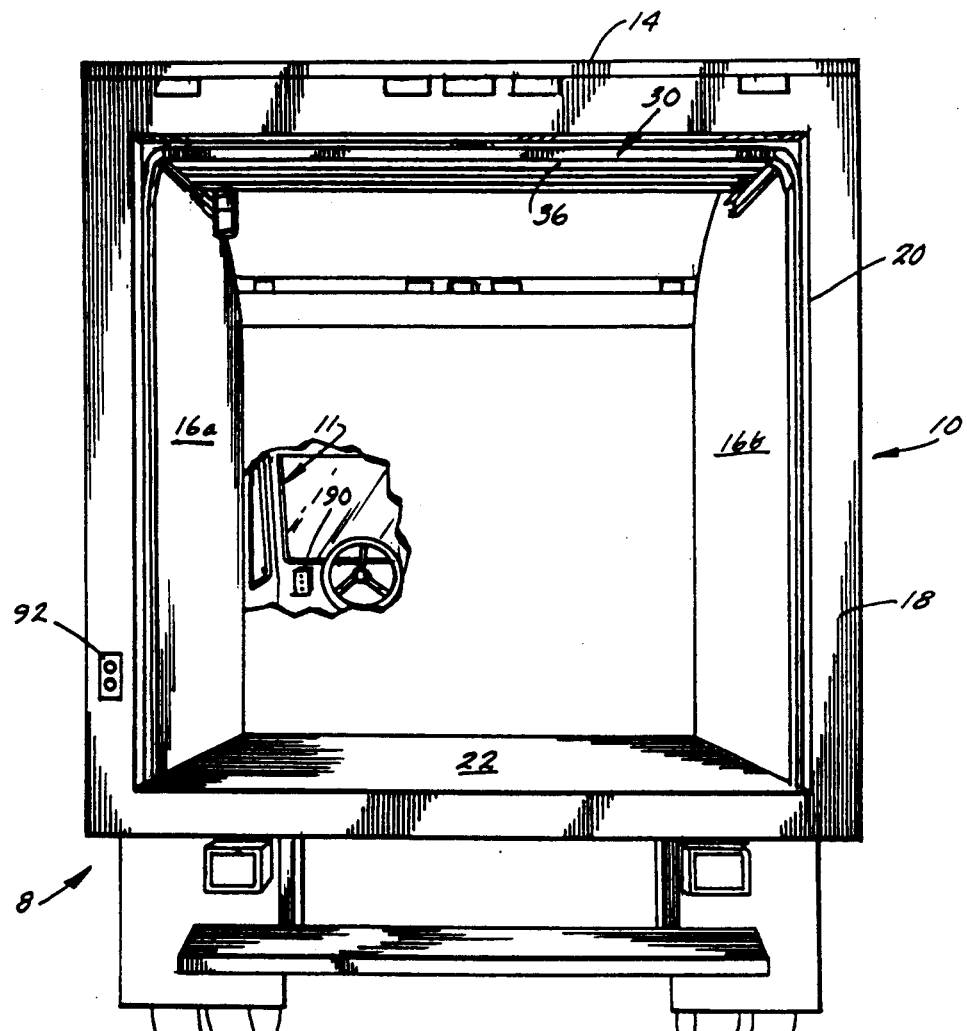
FIG. 1 is a rear cut away perspective view of a truck incorporating the door operating mechanism in accordance with the invention.
Figure 4:
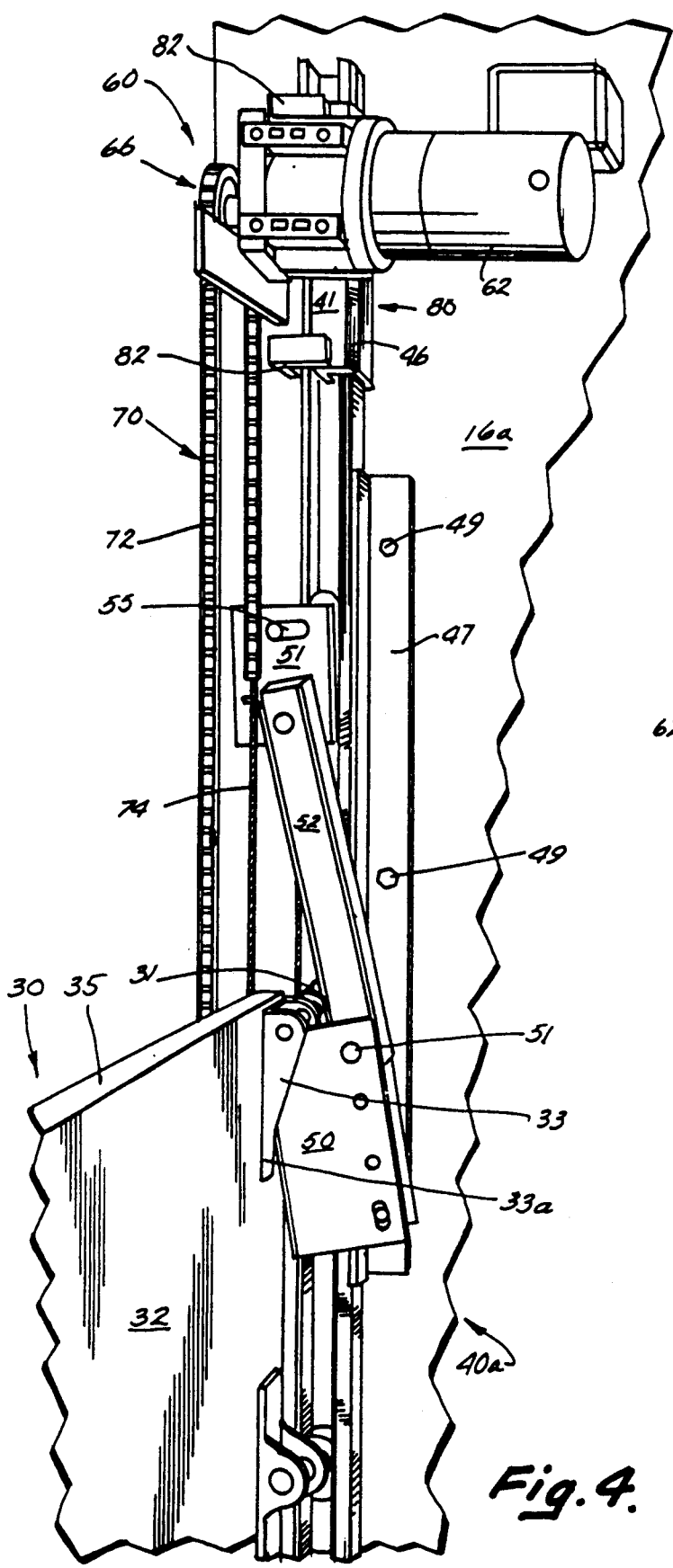
FIG. 4 is a fragmentary side elevational view of a portion of the truck showing the door in a fully open position.
Figure 2:
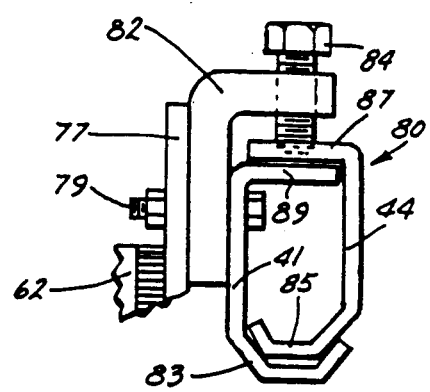
FIG. 2 is an end view of the vertical mounting angle for attaching the drive motor to a track section door.
Figure 3:
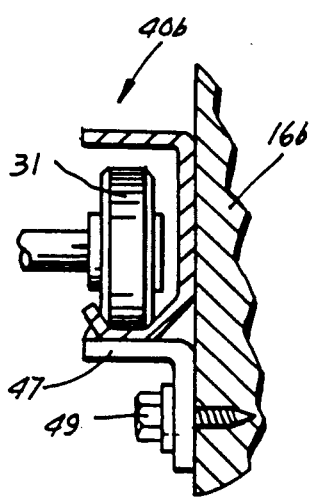
FIG. 3 is a sectional view of the horizontal track for the overhead door.

Referring to the drawings, FIG. 1 shows a conventional delivery truck 8 having a box-like container or body 10 mounted behind an enclosed cab 11, both of which are secured to a frame (not shown) defining a conventional delivery truck. The body includes a front wall 12, a roof or top 14, side walls 16a and 16b and a rear wall 18. The rear wall 18 includes an opening 20 which comprises essentially the entire rear of the body 10 extending from the floor 22 to facilitate ingress and egress. The rear opening is closed by a conventional sliding multi-paneled door 30 shown in the fully open position in FIGS. 1 and 5 and in the fully closed position in FIG. 4.

The door 30 is slidably mounted in a pair of conventional parallel C-shaped tracks 40a, 40b spaced along the end and sides of the trailer. The tracks 40 have vertical sections 42 (FIG. 4) shielded behind the end frame 14 and transitory curved sections 44 leading into horizontal sections 46 which extend along the upper edges of the trailer inboard sufficiently to allow the door to fully open. The door 30 slides by rollers 31 secured to mounting plates 33 attached to the door. The door and tracks are mounted in a conventional manner by fastener means including support bracket 47 to the side walls by bolts or screws 49.

The door 30 includes an upper panel 32 (FIG. 5), a plurality of intermediate panels 34, and a bottom panel 36 having a bottom edge 38. The panels 32, 34, and 36 have their ends hingedly connected to each other by a conventional roller plate 33 or folding plate 35 secured to the guide tracks 40 by a plurality of rollers 31 which guide the door through its movement. The upper panel 32 of the overhead door 30 is connected by a linkage mechanism (not shown) to a conventional counterbalance carriage and spring arrangement 38.

With the door 30 shown in the fully closed position (FIG. 4), a U-shaped mounting bracket 50 is attached to the roller mounting bracket 33 of upper panel 32. Mounting bracket 33 is conventionally attached to panel 32 by a fastener in turn secured to a plate 33a in turn secured to panel 32. Mounting bracket 50 is securely attached to bracket 33 by the same fastener (not shown) through an aperture in the web portion of bracket 50. A plurality of apertures can be provided in the web to allow adjustment.

A door link arm 52 pivotally connects mounting bracket 50 to a chain cable bracket 54. Pin 51 pivotally connects mounting bracket 50 with door link 52 while a chain 30, bracket 54 and link arm 52 are pivotally connected by a pin 56. Chain bracket 54 is mounted for movement along the guide horizontal section 44 of guide track 40 by a roller 31a rotatably anchored to bracket 54 by an axle 55. Both the bracket 50 and link arm 52 have multiple holes to permit adaptation to different sized vehicles.

Figure 7:
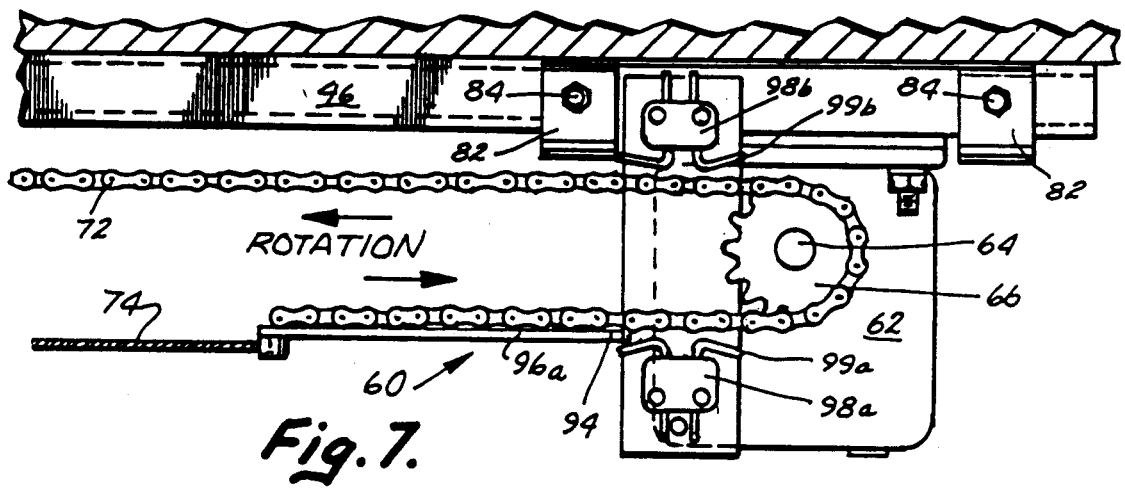
FIG. 7 is a fragmentary sectional view of the limit switch mechanism.
Figures 5, 6:
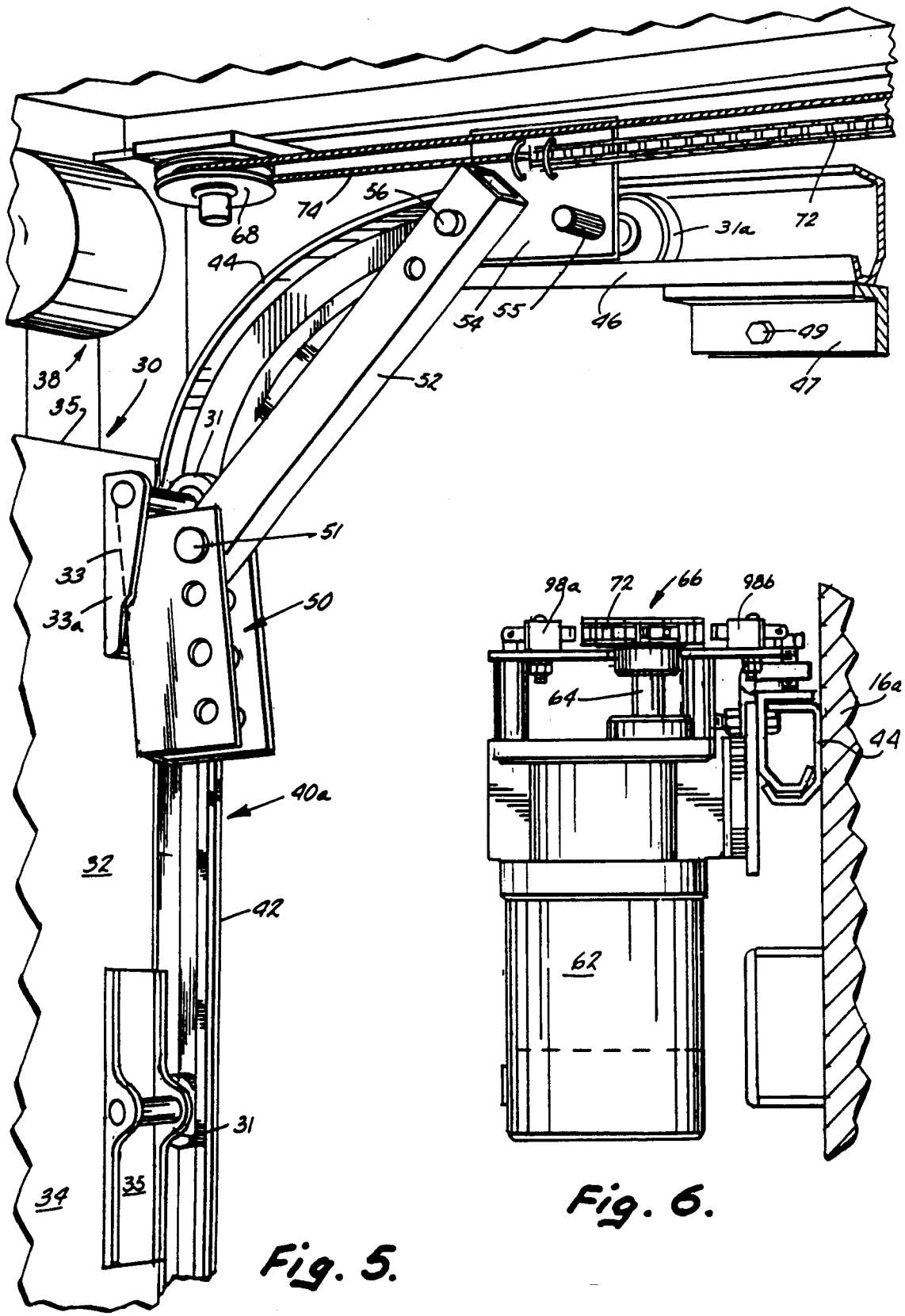
FIG. 5 is a fragmentary side view, of the truck with the door in a fully closed position.
FIG. 6 is a fragmentary sectional view of the vehicle wall showing an end view of the motor and attachment.

The combination of the mounting bracket 50, door link 52, and chain bracket 54 serves to open and close the overhead door 30 by movement of a motor driven cable-chain-pulley system 60 (FIGS. 5-7). System 60 consists of a reversible electric motor 62 mounted vertically along the side wall 16a with an upwardly extending vertical drive shaft 64 and a horizontal drive sprocket or wheel 66 fixed to the upper end of the drive shaft 64. The motor 62 is mounted to the horizontal section 44 of track 40a forward of the front edge 35 of the overhead door 30 when the door is in the fully opened position. A pulley 68 is mounted horizontally at the upper and rearward end corner of side wall 16a at the rear of the body 10 in the same plane as sprocket 66. It will be appreciated that other types of motors and specific configurations could be utilized.

A drive means 70 forms an endless loop between sprocket 66 and pulley 68. Drive means 70 preferably consists of an interconnected chain 72 and a cable 74, chain 72 interacting with drive sprocket 66 and cable 74 interacting with the pulley 68. The directional movement motor 62 and sprocket 66 determines whether drive means 70 moves in a clockwise or counterclockwise direction. In the preferred embodiment where drive means 70 consists of chain 72 and cable 74, chain 72 pulls bracket 54 causing door 30 to move to the open position while cable 74 pulls bracket 54 to cause door 30 to move to the closed position.

Electric motor 62 is electrically connected to the electric system of the truck (not shown) and is mounted to the horizontal section 44 of track 40 by mounting bracket 80. The motor is secured to mounting bracket 80 by a fastener 77 through a plate 79. Mounting bracket 80 consists of a relatively short section of track 41 identical to track 40 to the back of which a pair of L-shaped fittings 82 have been attached, for example by welding. The L-shaped fittings 82 each have a threaded therein for the insertion of a screw 84. Mounting 80 is attached to the track 44 by fitting the open face mounting bracket 80 into the open face of track 44 w the curved bottom portion 83 of mounting bracket 80 is underneath the curved bottom portion 85 of track 44 and upper flat portion 87 of the track 44 is between the portion 89 of the mounting bracket and the fittings 82. The screws 84 go through the fitting into contact the flat portion 87 of track 44 to pinch the curved port 83 and 85 together.

The operation of the door opening device may be controlled by various switches. Preferably, a first switch control box 90 (FIG. 1) for selectively actuating motor 62 to raise and lower overhead door 30 located in the cab of the vehicle to allow operation of door from within the cab. One toggle switch can be used raise, lower, or stop the door in any position. A second switch can be placed in box 90 to turn the entire system on or off which permits locking of the system when the cab is locked or alternatively, a keyed switch could be used. A red light can also be used in box 90 to alert driver if the door is ajar or open. Box 90 is preferably dash mounted. On the outside of truck trailer 10 by opening 20 (or along the side) is a second switch control box 92 to permit externally opening and closing door 30 when the system is armed from within the cab. It is envisioned that the door could also be remote controlled by a transmitter in cooperation with a receiver mounted within the vehicle. An external key lock could also be provided, for example, as part of box 92.

In operation the electric motor 62 activates drive shaft 64 which in turn rotates drive sprocket 66. The teeth of rotating drive sprocket 66 pull chain 72 which results in chain bracket 54 being pulled along with chain 72. This horizontal motion is translated by means of door link 52 to upper panel 32 of overhead door 30 when overhead door 30 begins its movement to the fully raised open position.

At each juncture of the cable and chain, there is mounted a trigger ramp 96a (one of which is shown in FIG. 7) which interact with a mated stop limit switch 98a to automatically stop movement of door 30 in either extreme position, i.e., open or closed. Trigger 96a is attached to chain 72 in such a manner where its ramped leading edge 94 strikes the "down" stop limit switch actuator 99a when the door is in the fully closed position. Similarly, a trigger (not shown) is attached to the other end of chain 72 in such a manner where its leading edge strikes the "up" stop limit switch actuator 99b when the door is in the fully open position. A safety feature is provided to protect a person or cargo from injury if it interferes with the moving door into its closed position. A preferred mechanism includes a thermal circuit breaker in a solid state board circuitry which is responsive to the temperature rise which will instantly occur due to increased loading of the drive motor if the door is blocked. Other arrangements, of course, could work equally well. Preferably, if the door is stopped by the safety mechanism, it will only reactivate in the "up" position after the "up" actuator is held on for more than one second. This safety device, of course, avoids extensive damage due to blockage or injury to a person.

While a preferred form the invention have been shown and described, other forms will be apparent to those skilled in the art. Therefore, it will be understood that the preferred embodiment shown in the drawings and described above is merely for illustrative purposes, and is not intended to limit the scope of the invention which is defined by the claims which follow.

The invention in which an exclusive property or privilege is claimed is defined as follows.

What is claimed is:

1. A power driven vehicular utility door operating mechanism for an enclosed container having a floor, ceiling, opposed sides, end and open rear selectively closed by a door, the door having multiple panels hinged together and moveable in opposed tracks, the tracks having a vertical section extending from the floor toward the ceiling along each side of the opening, a horizontal section extending along the upper edge of the sides of the container from the open end toward the front end, and a curved section interconnecting the vertical and horizontal sections whereby the door is moveable from a vertical position to fully close the opening to a generally horizontal position immediately beneath the ceiling to open the rear end, the mechanism comprising, in combination:

a reversible motor positioned adjacent one of said sides and in general alignment with the horizontal track section associated therewith, said motor including a drive shaft and a drive sprocket fixed to said drive shaft;

an idler pulley mounted in the same plane as said sprocket, said pulley being mounted at the upper end corner of said container adjacent said curved track section attached to said one of said horizontal track sections;

drive means cooperatively engaged with said drive sprocket and idler pulley forming an endless loop, said drive means moving in clockwise or counterclockwise direction depending on the direction movement of said motor drive sprocket;

link means interconnected to said drive means and said door, whereby movement of said drive means in one direction will raise said door selectively between a fully closed position to a fully open position and movement of said drive means in the other direction opposite said one direction will move said door from a fully raised open position to a fully closed position; and control means for selectively actuating said motor to raise and lower said door to said fully open or closed positions or positions intermediate thereto.

2. The door operating mechanism of claim 1, wherein said drive means includes a combination chain/cable arrangement.

3. The door operating mechanism of claim 1, wherein the link means comprises a chain bracket, a drive arm and a door mount member.

4. The door operating mechanism of claim 1, wherein said motor is an electric motor mounted vertically, said drive shaft extends vertically upwards, said drive sprocket fixed to said shaft in a generally horizontal plane.

5. The door operating mechanism of claim 4, wherein the electric motor has a switch plate in combination with limit switches and a trigger sample.

6. The door operating mechanism of claim 1 wherein said control means includes operating switches within and without the vehicle including automatic control means halting the movement of said door upon striking an object positioned in interference with the movement of said door.

7. The door operating mechanism of claim 1, wherein the door operating mechanism may be operated remotely from the vehicle.

8. The door operating mechanism of claim 1, wherein the door operating mechanism may be locked to prevent unintended opening of the door.

9. The door operating mechanism of claim 1 wherein said motor is mounted directly to said one of said horizontal track sections.

10. The door operating mechanism of claim 9 wherein said mechanism further includes a mounting bracket attached to said motor and having means to permit removable attachment of said motor and bracket to one of said horizontal track sections.

11. The door operating mechanism of claim 10 wherein said mounting bracket includes a relatively short rail section corresponding in cross section to said guide track, said rail section inversely mating with a section of said guide track, said rail section including one or more fasteners engageable with said track to removably and adjustably clamp said rail section and associated motor to said track.

12. The door operating mechanism of claim 1 wherein said drive means is movably engaged with said one of said horizontal track sections.

13. A truck or the like, including, in combination:

a vehicle frame, an enclosed cab mounted on said frame, and a body having an opening said body having a roof, floor, side and end walls, said opening being in the rearward end wall of said body;

guide means in said truck positioned alongside said opening and continuing inwardly in said body said guide means including spaced tracks extending vertically along said opening and curving to extend horizontally immediately beneath said roof and adjacent said sides;

closure means operably connected to said guide means for movement along said guide means to selectively close or open said opening said closure means is a multipaneled foldable door, said door in said fully closed position being vertical, and in said fully open position being generally horizontally positioned immediately beneath said roof;

drive means mounted within said body along one of said sides and immediately beneath said roof and interconnected with said guide means to automatically move said closure means between a fully opened and fully closed position; and control means for selectively operating said drive means, said drive means comprising a low profile reversible motor, said motor being capable of utilizing electric energy generated by the truck or one or more storage batteries.

14. The truck of claim 13 wherein said control means includes a first switch in said cab for actuating said drive means to select the position of said door.

15. The truck of claim 14 wherein said truck includes a frame, said cab and body mounted on said frame, said control means including a second switch external of said cab for actuating said drive means to select the position of said door, said first switch means controlling the activation of said second switch means.

16. The truck according to claim 14 wherein said motor includes a vertical extending drive shaft, a horizontal drive sprocket fixed to the upper end of said drive shaft, a pulley mounted horizontally in the same plane as said sprocket, an endless loop means cooperatively engaged with said sprocket and pulley and movable in a clockwise or counterclockwise direction, a linking member cooperatively engaged with said loop means and door whereby movement of said loop means by actuation of said motor moves said door between said fully closed and open positions.

17. The truck according to claim 14 wherein said control means includes one or more switches adjacent said loop means and one or more triggers on said loop means whereby the movement of a trigger into engagement with a switch adjacent said loop means causes said motor to stop.

18. The truck according to claim 13 wherein said control means includes sensing means to detect the pressure of an object in the path of said door when moving into a closed position whereby said door motor is deactivated when edge of said door is subjected to an opposing force, the magnitude of said force being less than sufficient to cause injury to a person under normal conditions.

19. The truck according to claim 13 including a mounting bracket removably attachable to said guide means, said motor being removably attachable to said mounting bracket.

20. A power driven door operating mechanism for a vehicle having a vehicle frame, an enclosed cab mounted on said frame and an enclosed body mounted on said frame rearward of said cab, said body having a roof, floor, spaced sides and front and rear ends, the rear end of said body having means defining an opening essentially the size of said end and a foldable sliding door mounted on guide tracks whereby the door is movable between a fully closed position where said door is vertical and a fully open position wherein said door is essentially horizontally positioned adjacent to and beneath the roof, the operating mechanism comprising, in combination:

a low profile motor electrically interconnected to the battery and electrical generator of the truck, said motor including a drive shaft rotatable in a clockwise or counterclockwise direction, said motor being removably mounted to the forward end of one of said guide tracks adjacent the roof of said body;

a drive wheel secured to said drive shaft;

an idler wheel secured to said body adjacent the roof at a rearward point adjacent said one of said guide tracks and in alignment with said drive wheel;

an endless loop mounted about said wheels;

link means interconnecting said loop, said one guide track and said door whereby movement of said loop urges said door between an open and closed position; and control means for activating said motor to move said loop and interconnected door.

21. The mechanism according to claim 20 whereby said control means includes a first switch in said cab electrically interconnected to said motor to turn said motor on in either of said directions depending on the position of said door.

22. The mechanism according to claim 21 wherein said control means may be locked from inside said cab so as to prevent opening of said door.

23. The mechanism according to claim 22 wherein said control means includes a trigger on said loop and a second switch adjacent said loop to permit engagement by said trigger, said second switch when engaged by said trigger during movement of said loop turning said motor off.

24. The mechanism according to claim 23 wherein said control means includes a third switch external of said cab electrically interconnected to said motor to turn said motor on in either of said directions depending on the position of said door when said control means are not locked.

25. The mechanism according to claim 24 wherein said control means includes a fourth switch adjacent said loop and spaced from said second switch and a second trigger mounted on said loop and spaced from said first trigger and engageable with said fourth switch, said second and fourth switch and said first and second trigger being positioned such that movement of said door toward the closed position causes one of said trigger and switch sets to turn said motor off when said door is in the closed position and said other set of trigger and switch causing the motor to turn off when said door reaches a fully opened position.

26. The mechanism according to claim 20 wherein said control means includes a safety switch which stops the movement of said door when said door strikes an object in interference with its movement.

27. The mechanism according to claim 26 wherein said safety switch is a thermal circuit breaker responsive to increased heating of said motor.

28. A vehicular utility door operating mechanism according to claim 27 wherein said motor is mounted directly to the guide track.

29. A vehicular utility door operating mechanism according to claim 28 wherein said mechanism includes a mounting bracket having the cross-sectional configuration of said track to inversely mate with said track and include clamp means to clamp said bracket to said track.

30. A vehicular utility door operating mechanism according to claim 29 wherein said bracket and track have a C-shaped cross section to permit overlapping tongue-and-groove engagement of same, said clamp means including one or more L-shaped adapters welded to said bracket having threaded apertures therethrough and a threaded bolt engageable with said threaded apertures to clamp said track and bracket together.

31. A vehicular utility door operating mechanism according to claim 27 wherein said motor is mounted directly to said guide track by a mounting bracket.

* * * * *

UNITED STATES PATENT AND TRADEMARK OFFICE
CERTIFICATE OF CORRECTION

PATENT NO. : 5,056,847
DATED : October 15, 1991
INVENTOR(S) : Richard L. Stillwell et al It is certified that error appears in the above-identified patent and that said Letters Patent is hereby corrected as shown below:

Column 3, line 37;
  After "bracket 47" insert --secured--;

Column 3, line 62;
  After "chain" delete --30--;

Column 4, line 37;
  After "threaded" insert --aperture--;

Column 4, line 38;
  After "Mounting" insert --bracket--;

Column 4, line 39;
  After "face" insert --of--;

Column 4, line 40;
  "w" should be --whereby--;

Column 4, line 42;
  After "and" insert --the--;

Column 4, line 43;
  After "the" (second occurrence) insert --upper flat--;

Column 4, line 45;
  After "contact" insert --with--;

Column 4, line 46;
  "port" should be --portions--;

Column 4, line 50;
  After "door 30" insert --is--;

UNITED STATES PATENT AND TRADEMARK OFFICE
CERTIFICATE OF CORRECTION

PATENT NO. : 5,056,847

DATED : October 15, 1991

INVENTOR(S) : Richard L. Stillwell et al

It is certified that error appears in the above-identified patent and that said Letters Patent is hereby corrected as shown below:

Column 4, line 51;
  After "of" (second occurrence) insert --the--;

Column 4, line 52;
  After "used" insert --to--;

Column 4, line 57;
  After "alert" insert --the--;

Column 6, Claim 1, line 2;
  "direction" (second occurrence) should be --directional--.

Signed and Sealed this

Twenty-fifth Day of May, 1993

Attest:

MICHAEL K. KIRK

*Attesting Officer*  *Acting Commissioner of Patents and Trademarks*